INVENTORS
KENNETH J. CLEEREMAN
EDWARD R. SEDERLUND
BY
Dominik, Stein & Knechtel
ATTYS.

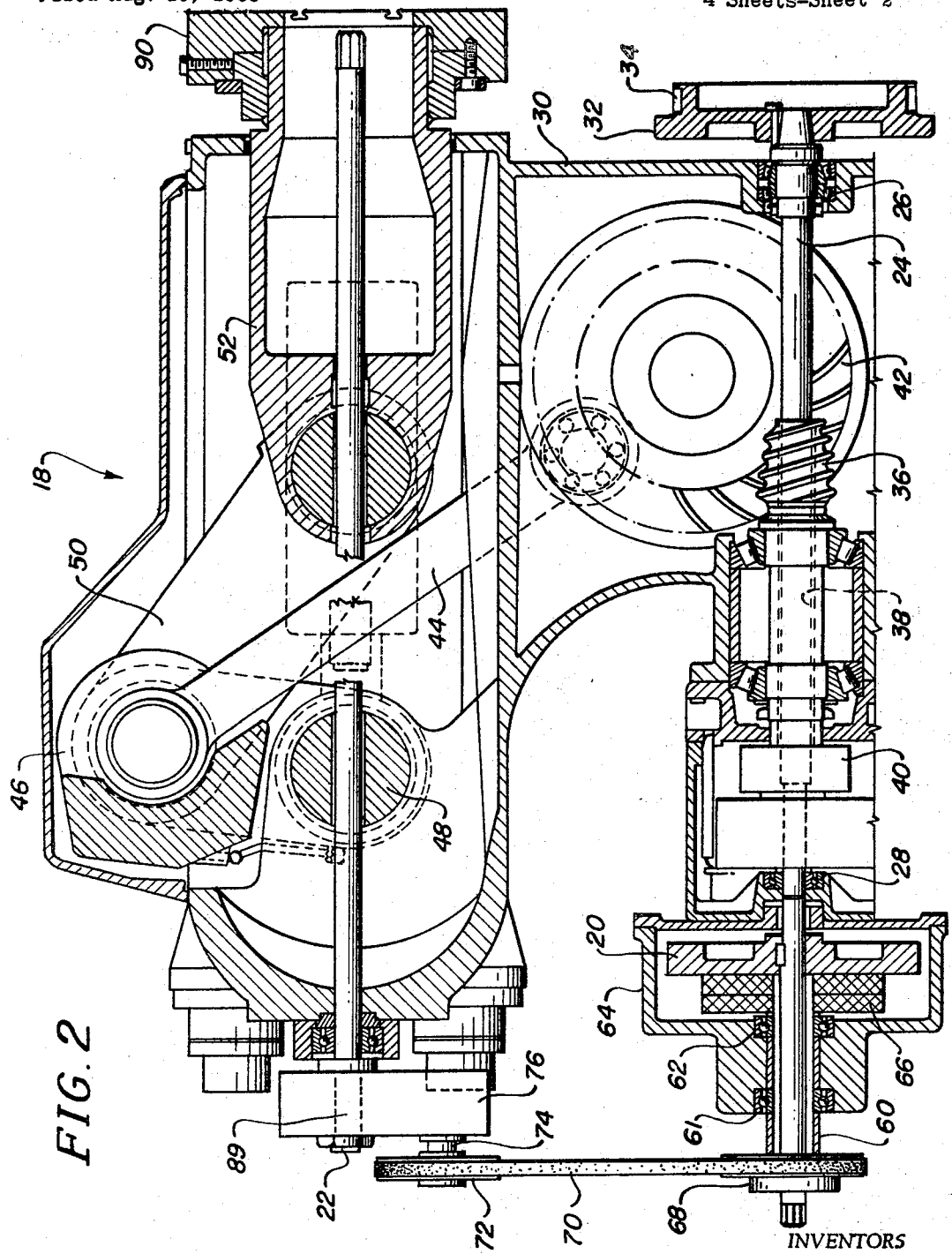

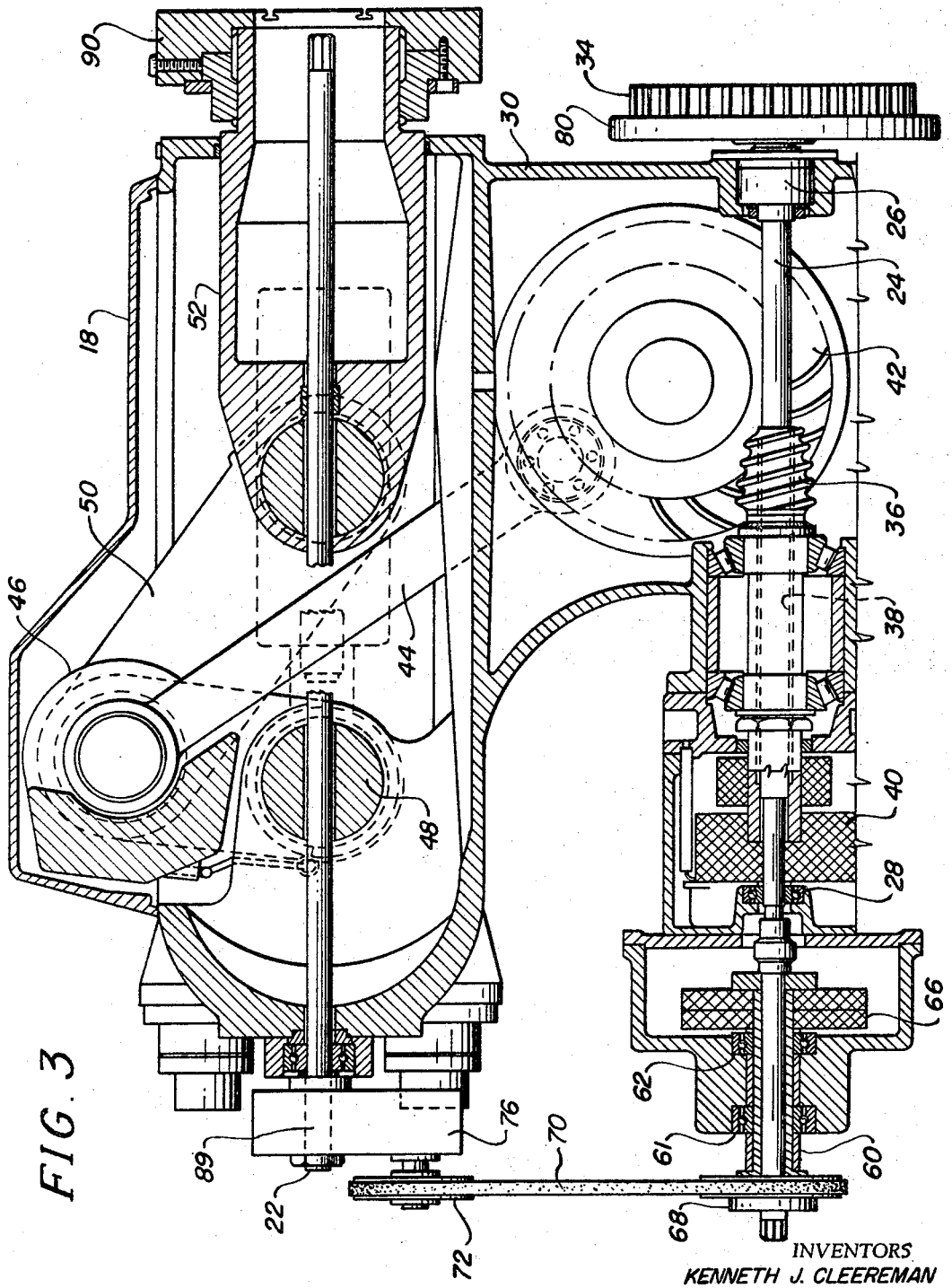

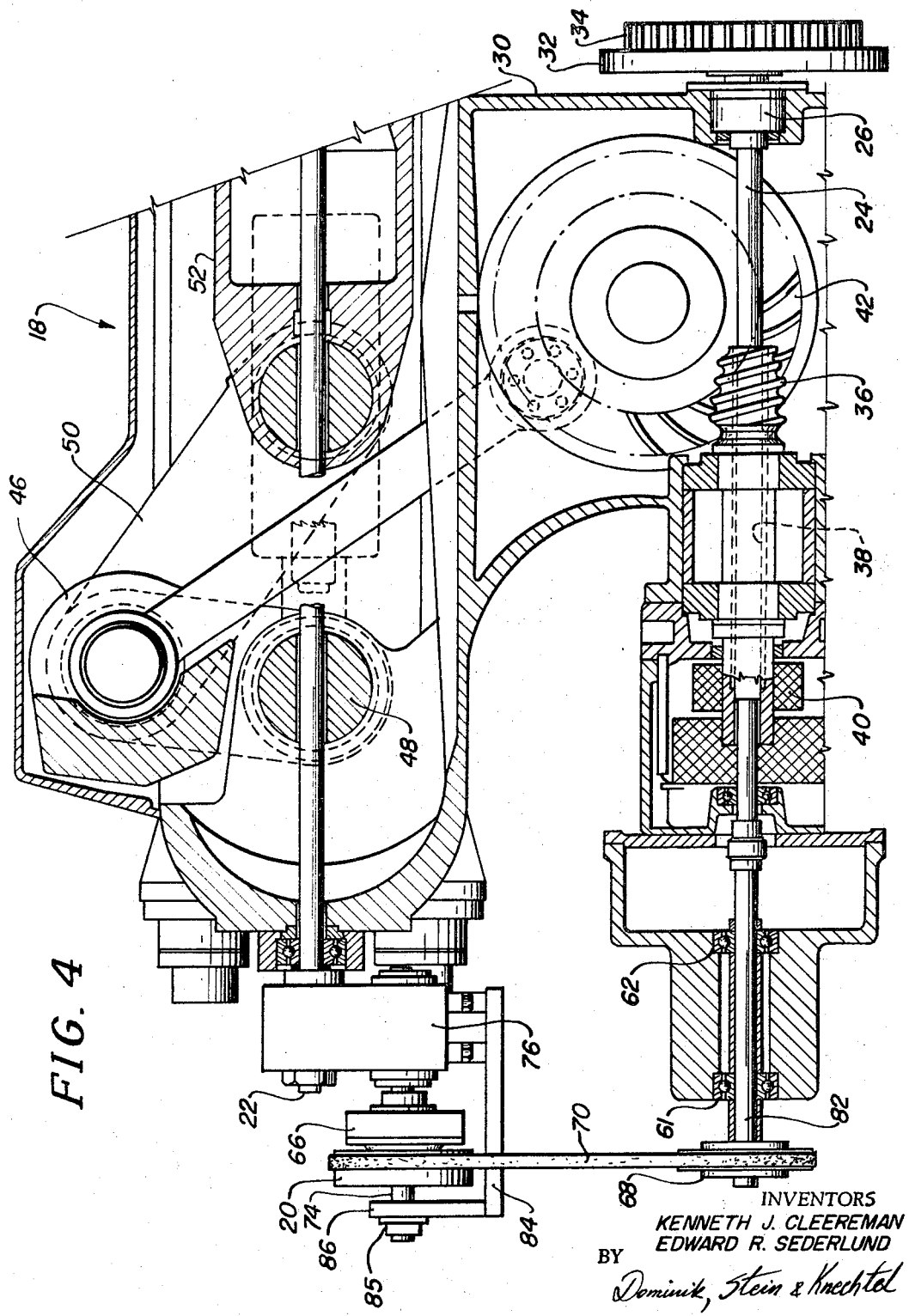

United States Patent Office 3,401,427
Patented Sept. 17, 1968

3,401,427
FLYWHEEL DRIVE FOR ROTATING MOLD
Kenneth J. Cleereman, Midland, and Edward R. Sederlund, Saginaw, Mich., assignors to The Dow Chemical Company, Midland, Mich., a corporation of Delaware
Filed Aug. 10, 1966, Ser. No. 571,626
16 Claims. (Cl. 18—30)

This invention relates to apparatus for molding of products of rotational symmetry wherein multidirectional orientation is automatically imparted to the plastic material used to mold the product. More particularly, this invention relates to molding apparatus having improved driving means for rotating one of the mold elements, to impart multidirectional orientation to plastic material used to mold a product.

In the prior art there is disclosed a method and apparatus for automatically imparting a multidirectional orientation to the plastic material used to mold a product. The apparatus includes injection molding apparatus having a rotatable male mold element, although the female mold element could likewise be made rotatable. The male mold element comprises the forward end of a mandrel which is rotatably secured within a thrust bearing within a mold block. The entire mold block reciprocates upon slide rods to permit opening and closing of the mold cavity.

The mandrel and hence the male mold element is rotated by means of a presettable constant torque motor via a gear assembly on the rear of the mandrel.

The described driving arrangement for the mandrel and the male mold element functions entirely satisfactorily, however, the power required to rotate the mandrel and male mold element is disproportionately high in comparison to the actual power consumption of the system. This is due to the fact that the torque applied to the mandrel to rotate it and the male mold element must be at its maximum at the instant it is applied. Accordingly, a relatively high horsepower motor must be provided so that upon activation its output torque reaches the required torque almost instantaneously. Furthermore, this torque is applied to rotate the mandrel and the male mold element for only a fraction of a second, to provide the desired multidirectional orientation of the plastic. It can therefore be seen that substantial savings can be provided by providing a more efficient method for applying the torque to rotate the mandrel and the mold element.

Accordingly, it is an object of the present invention to provide improved apparatus for imparting multidirectional orientation to plastic used to mold a product.

A more particular object is to provide a more efficient method and apparatus for applying torque to a rotatable mold element, to impart multidirectional orientation to plastic.

Another object is to provide improved apparatus for applying torque to a rotatable mold element, to impart multidirectional orientation to plastic, which can be easily adapted to existing molding apparatus. In this respect, it is contemplated that the improved apparatus be adaptable to both injection and impact molding apparatus.

Still another object is to provide improved apparatus of the described type which is relatively inexpensive in comparison to the apparatus presently generally used.

A still further object is to provide improved apparatus of the described type which employs a flywheel.

Other objects of the invention will in part be obvious and will in part appear hereinafter.

The above objectives are accomplished, briefly, by providing a flywheel which is rotated at a constant speed, and coupling said flywheel to the rotatable mold element using a clutch or the like, to instantaneously supply the required torque to the mold element to impart multidirectional orientation to the plastic.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For fuller understanding of the nature and objects of the invention, reference should be had to the following detailed description taken in connnection with the accompanying drawings in which:

FIG. 2 is a sectional view of a clamping assembly, illustrating the manner in which a flywheel is adapted to rotate one of the mold elements;

FIGS. 3 and 4 are sectional views like FIG. 2, each illustrating second and third alternative manners, respectively, in which the flywheel can be adapted to rotate the mold element.

Similar reference characters refer to similar parts throughout the several views of the drawings.

Figure 1:
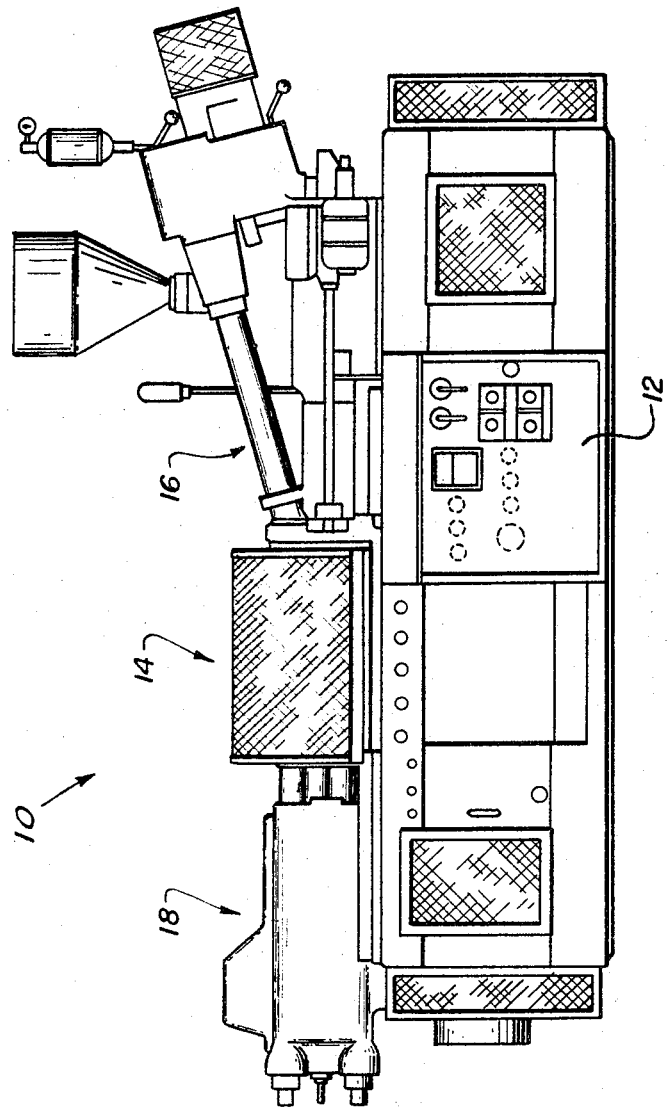
FIG. 1 is a plan view of an injection molding apparatus, exemplary of the type which can be adapted to impart multidirectional orientation to the plastic used to mold an article therein.

Referring now to the drawings, in FIG. 1 there is illustrated an injection molding machine 10 of generally standard design, having a base 12 for enclosing the components for operating it, an injection unit 14, an extruder unit 16, and a clamping unit 18. The injection molding machine 10 may be a "Husky 150P," manufactured by the Husky Manufacturing and Tool Works Limited of Toronto, Ontario, Canada. The operation of injection molding machines is generally well known, hence a detailed discussion of the same is believed to be unnecessary. The primary feature added to standard injection molding machines by the present invention is apparatus for rotating one of the mold elements of the injection molding machine.

In FIG. 2, there is illustrated a clamping unit 18 having included therein a flywheel 20 which maybe drivingly coupled to a shaft 22 that is adapted to be affixed to one end of a mandrel (not shown), the opposite or forward end of which comprises a male mold element, for rotating the shaft and the mandrel.

The clamping unit 18 also includes a shaft 24 which is rotatably retained within bearing assemblies 26 and 28 affixed with a housing 30 of the clamping unit. A second flywheel 32 is fixedly secured to one end of the shaft 24, and has a pulley belt groove 34 formed in its outer peripheral surface for receiving a pulley belt (not shown) for driving coupling a motor (not shown) to the flywheel for rotating it.

A hollow shaft 38 having a pinion 36 integrally formed on its one end is rotatably fixed about the shaft 24. The pinion 36 is drivingly engaged with a gear 42. A clutch brake 40 is affixed to the opposite end of the shaft 38 and is adapted to couple the shaft 38 to the rotating shaft 24 and to engage the pinion 36 with the gear 42 to drive it.

The gear 42 is rotatably mounted and has one end of a crank arm 44 eccentrically affixed to it. The opposite end of the crank arm 44 is pivotally affixed to one end of a lever arm 46 which is pivotally affixed by means of a pivot pin 48 to the housing 30 of the clamping unit. A second lever arm 50 is pivotally affixed at its one end to the same end of the lever arm 46 to which the crank arm 44 is affixed, and is pivotally affixed at its other end to a clamp column 52.

The operating of the clamping unit 18 may be generally described as follows: the flywheel 32 is driven in the manner described above to rotate the shaft 24. At the start of a molding cycle, the clutch-brake 40 which may be an electromagnetic clutch-brake is activated to couple the shaft 38 to the rotating shaft 24, to drivingly engage the gear 42 and thereby rotate it. As the gear 42 rotates, the crank arm 44 and the lever arms 46 and 50 are operated to move the clamp column 52 to position the male mold (the end of the mandrel affixed to the shaft 22) within the mold cavity to close it. When the mold cavity is closed, the clutch-brake 40 operates to hold the mold cavity closed and, upon completion of the molding cycle, the clutch-brake again operates to drivingly couple the pinion 36 and the gear 42 so as to operate the crank arm 44 and the lever arms 46 and 50 to remove the male mold from the mold cavity, thereby opening it to permit the molded part to be ejected.

In accordance with the present invention, multidirectional orientation is imparted to the plastic used to mold the part, by rotating one of the mold elements which, in the illustrated case, is the male mold element. This is efficiently accomplished by fixedly securing the flywheel 20 to the opposite end of the shaft to which the flywheel 32 is affixed, so that the flywheel 20 is also rotated. A shaft 60 is rotatably retained within bearing assemblies 61 and 62 and bushing 63 secured with a housing 64 for the flywheel 20, and is adapted to be drivingly coupled to the flywheel 20 by a clutch 66. A gear 68 is affixed to the end of the shaft 60, and is drivingly coupled by a timing belt 70 to a gear 72 affixed to an input shaft 74 of a gear box 76. The gear box 76 includes a gear train which is coupled to and rotatably drives the shaft 22, to thereby rotate the mandrel (not shown) affixed to its end, which mandrel comprises the male mold element.

With this arrangement, it can be seen that the flywheel 20 constitutes a source of stored power which is readily available and can be instantaneously applied to supply necessary torque to the mandrel to impart the multidirectional orientation to the plastic used to mold the part. The flywheel 20 is driven by means of the same motor (not shown) used to drive the flywheel 32, hence the need for an additional motor is eliminated. More importantly, there is no need for a high horsepower motor, as in the case of the apparatus of the above described copending application. Furthermore, the weight of the flywheels 32 and 20 each can be reduced so that the total weight of the two flywheels is sufficient to provide the desired performance. This is due to the fact that the operations of closing the mold cavity and of rotating the mandrel occur at spaced periods of time so that the full stored power of the two flywheels is available and can be used for each of the two operations. The reduction in weight results in long useful life, since the strain on the bearing assemblies, bushings and the like is substantially reduced.

The operation of the injection molding machine with the addition of the apparatus for rotating the mandrel is the same as described above, up to the time that the mold cavity is closed. The clutch 66 may be operated in several different ways. For example, the clutch 66 may be an electromagnetic clutch operated substantially simultaneously with the injection stroke of the injection unit 14. This may be accomplished by the simple addition of a switch which is positioned to be operated mechanically by the apparatus of the injection unit 14, when the latter completes its operation of filling the mold cavity, to electrically energize the clutch 66. Upon energization, the clutch 66 functions to couple the flywheel 20 to the shaft 60 to cause it to be rotated. Alternatively, the clutch 66 can be incorporated into and operated by means of fill point determination circuitry of the type disclosed in a recently filed patent application.

The clutch 66 may also be an air operated clutch which is supplied air pressure to operate it through a solenoid valve or the like which is, in turn, operated by the injection unit 14 or the above-mentioned fill point determination circuit. An air clutch exemplary of those which may be used is the model 10H200, size 10, Power Flo air clutch having a standard bolted size 10 back plate, part number 3034–02, manufactured by the Mid-States Ind. Clutch Co., Inc.

Upon operation of the clutch 66, the flywheel 20 is coupled to the shaft 60, to supply an instantaneous torque to it which is substantially equivalent to the maximum torque available, at the moment of application. The torque applied to the shaft 60 is coupled to the shaft 22 via the gears 68 and 72, the timing belt 70, and the gear train within the gear box 76, and hence to the mandrel forming the male mold element affixed to the opposite end of the shaft 22, to cause it to rotate. After the mandrel or male element has rotated a predetermined number of revolutions sufficient to impart multidirection orientation to the plastic, the clutch 66 is operated to release the coupling between the flywheel 20 and the shaft 60. The control means may be of any suitable type capable of de-energizing the clutch 66, if it is an electromagnetic clutch, or the solenoid controlling the supply of air to it in the event it is an air clutch. Control circuitry of the type disclosed in the copending application Ser. No. 384,664 supra may advantageously be used for this purpose.

At the completion of the molding cycle, the clutch 40 is again operated to drivingly engage the pinion 36 with the gear 42 to open the mold cavity and to eject the molded article, in the manner described above.

In FIG. 3, there is illustrated a clamping unit 18 which has been modified to rotate the mandrel, or male mold element, in accordance with a second embodiment of the invention. The basic construction of the clamping unit 18 is identical, however, in this case, only a single flywheel 80 is used, in conjunction with the clutches 40 and 66. The mass of the flywheel 80 is scaled to provide the desired torque to both operate the injection molding apparatus and to rotate the mandrel. In all other respects, the structure of the clamping units 18 of FIGS. 2 and 3 are the same.

In the operation of the clamping unit of FIG. 3, the injection molding apparatus is operated to close the mold cavity, in the manner described above, by operating the clutch 40 to drivingly engage the pinion 36 and the gear 42. The clutch 66 is then operated to couple the shaft 60 to the rotating shaft 24, to couple the torque of the flywheel 80 to the shaft 22 to rotate the mandrel. As it is apparent from the above description, the operation of closing the mold cavity and of rotating the mandrel occur at two different spaced periods of time and the full torque of the flywheel 80 is available to perform the respective functions. Accordingly, the size of the motor needed to operate the clamping unit 18 and to rotate the mandrel is not substantially different from the motor required for the operation of the clamping unit itself. Accordingly, by merely increasing the mass of the flywheel 80 and providing the additional clutch 66 and its associated coupling between the shafts 60 and 22, the desired rotation can be provided relatively inexpensively.

In FIG. 4 there is illustrated still another manner in which the clamping unit 18 can be modified to rotate the mandrel. In this case, the shaft 24 is lengthened to extend out of the housing 30, or a shaft 82 is fixedly secured to its end to form an extension, and the gear 68 is affixed to it, as in the above described embodiments. The input shaft 74 of the gear box 76 is likewise extended, and the flywheel 20 and the clutch 66 is affixed and adapted to be coupled to the shaft 74. An L-shaped bracket 84 can be affixed to the gear box 76 and the end of the shaft 74 rotatably supported within a bearing assembly fixed within the arm 86 of the bracket.

The flywheel 32 and hence the shaft 24 is rotated in the manner described above, and the gear 68 is affixed to its extended end or the extension shaft 82 is likewise rotated.

The operation of the clamping unit 18 to close the mold cavity is the same as described above.

The rotation of gear 68 is coupled by the timing belt 70 to the flywheel 20, so that it rotates on the shaft 74 and constitutes a source of stored energy for applying an instantaneous torque to rotate the shaft 22 and hence the mandrel. The clutch 66 is operated in the described manner, to couple the flywheel 20 to the input shaft 74 of the gear box 76 to provide the desired torque. With this arrangement, it can be seen that the driving arrangement and source of power for rotating the mandrel can be easily and quickly adapted to existing injection molding machines having a shaft which is constantly rotated at a fixed rotational speed. Another manner in which the clutch and flywheel can be easily and quickly adapted to injection molding apparatus is to provide a clutch and flywheel assembly as illustrated in FIG. 4, in combination with a source of power for rotating the flywheel independently of the source of power for the injection molding apparatus. With an arrangement of the latter type, virtually any type of mold apparatus can be adapted for rotation of one of the mold elements.

In injection molding apparatus of the disclosed type, the typical operating or rotational speed of the shaft 24 is approximately 1750 r.p.m. With this speed, a 2:1 timing belt ratio, in conjunction with a gear box having a 5:1 ratio is desirable to provide a rotational speed of approximately 175 r.p.m. for the shaft 22, or mandrel.

If desired, or necessary, the end 89 of the shaft 22 can be splined to permit the shaft 22 to move with the platen 90 when the clamp column 52 is moved. Appropriate bearings and seals are also provided, in such a case.

Also, the injection molding apparatus 18 can be converted to an impact molding apparatus in substantially the same fashion, by providing appropriate bearings and seals for the shaft 22. In such a conversion, the injection unit 14 is adapted to inject the desired amount of plastic into the mold cavity and the pinion 36, gear 42, crank arm 44 and lever arm 46 and 50 are adapted to drive the mandrel into the mold cavity with sufficient force to impact mold the article. In this case, also, the mandrel can be rotated by providing the described rotating driving arrangement.

It will thus be seen that the objects set forth above, among those made apparent from the preceding description, are efficiently attained and, since certain changes may be made in carrying out the above process and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. Apparatus for the rotational molding of an article whereby multidirectional orientation is automatically imparted to the molecules of said article to effect strength in all directions comprising: a cavity mold formed of at least two elements, one of said elements being rotatable; means for opening and closing said mold; a source of stored rotational force having a torque of a substantially constant preset level; coupling means for coupling said source to said rotatable element to substantially instantaneously rotate said rotatable element at said preset torque level; and control means for operating said coupling means to rotate said rotatable element a predetermined number of revolutions for imparting said multidirectional orientation to the molecules of said article.

2. Apparatus, as claimed in claim 1, wherein said source of stored rotational force comprises a flywheel which is rotated at a predetermined constant speed so that a torque of a substantially constant preset level can be substantially instantaneously coupled to said rotatable element to rotate it.

3. Apparatus, as claimed in claim 1, wherein said source of stored rotational force comprises a flywheel, and wherein said apparatus further includes a shaft affixed to and adapted to rotate said rotatable mold element, said flywheel being coupled to said shaft by said coupling means in response to the operation of said control means, and means for rotating said flywheel at a predetermined constant speed.

4. Apparatus, as claimed in claim 3, wherein said coupling means comprises clutch means which are adapted to couple said flywheel to said shaft.

5. Apparatus, as claimed in claim 4, wherein said control means comprises detecting means for detecting when said mold cavity is filled and for providing an output signal for operating said coupling means to couple said flywheel to said shaft to rotate said shaft a predetermined number of revolutions to impart multidirectional orientation to the molecules of said article.

6. Apparatus as claimed in claim 4, further including injection means for injecting material into said mold cavity and wherein said control means comprises switch means for operating said coupling means to couple said flywheel to said shaft to rotate said shaft a predetermined number of revolutions to impart multidirection orientation to the molecules of said article, said switch means being automatically operated by said injection means at the end of each injection stroke thereof.

7. Apparatus, as claimed in claim 4, wherein said coupling means further includes a gear train having a plurality of gears having a gear ratio to decrease the rotational sped of said shaft with respect to the rotational speed of said flywheel.

8. Apparatus, as claimed in claim 1, further including a first shaft, motor means coupled to said first shaft for rotating it, said means for opening and closing said mold being coupled to and operated by said first shaft, a first and a second flywheel coupled to said first shaft for providing a constant torque for opening and closing said mold and for rotating said rotatable element, a second shaft fixed to said rotatable element, said coupling means including clutch means which is operable to couple said first and said second shafts together in response to the operation of said control means, whereby the torque of said first and said second flywheels is applied to said rotatable element to rotate it.

9. Apparatus, as claimed in claim 8, further including second control means operable to operate said means for opening and closing said mold, the operative sequence of the operation of said control means and said second control means being at spaced periods of time, whereby the full available torque of said first and second flywheels can be applied to said means for opening and closing said mold and to rotate said rotatable mold element, respectively.

10. Apparatus, as claimed in claim 8, wherein said coupling means further includes first and second gear means coupled to said clutch means and to said second shaft, respectively, and a driving connection between said first and second gear means.

11. Apparatus, as claimed in claim 9, wherein a single flywheel having a mass corresponding to the mass of said first and second flywheels is provided in substitution for said first and second flywheels, said single flywheel being affixed to said first shaft.

12. Apparatus, as claimed in claim 1, wherein said means for opening and closing said mold comprises a first shaft, a flywheel affixed to said first shaft, motor means coupled to said flywheel for rotating it at a predetermined constant speed, lever arm means yivotally affixed to said rotatable mold element, gear means adapted to be coupled to said lever arm means for operating said lever arm means to close said mold, first clutch means for operatively coupling said gear means to said lever arm means, a second shaft fixed to said rotatable mold element, said coupling means including clutch means for coupling said first and second shafts together in response to the operation of said control means to apply the torque of said flywheel to said rotatable mold element to rotate it, said flywheel constituting said source of stored rotational force.

13. Apparatus, as claimed in claim 12, wherein said coupling means further includes first and second gear means coupled to said clutch means and to said second shaft, respectively, and a driving connection between said first and second gear means.

14. Apparatus, as claimed in claim 12, wherein said control means comprises detecting means for detecting when said mold cavity is filled and for providing an output signal for operating said coupling means to couple said flywheel to said shaft to rotate said shaft a predetermined number of revolutions to impart multidirectional orientation to the molecules of said article.

15. Apparatus, as claimed in claim 12, further including injection means for injecting material into said mold cavity and wherein said control means comprises switch means for operating said coupling means to couple said flywheel to said shaft to rotate said shaft a predetermined number of revolutions to impart multidirection orientation to the molecules of said article, said switch means being automatically operated by said injection means at the end of each injection stroke thereof.

16. Apparatus, as claimed in claim 12, further including a second flywheel affixed to said first shaft, said two flywheels having a combined mass which is calculated to provide the desired torque to rotate said rotatable mold element to impart multidirectional orientation to the molecules of said article.

References Cited

UNITED STATES PATENTS

| | | | |
|---|---|---|---|
| 3,030,668 | 4/1962 | Taylor | 18—5 X |
| 3,041,699 | 7/1962 | Daniel | 18—26 X |
| 3,220,102 | 11/1965 | Lieberman et al. | 18—26 X |
| 3,290,423 | 12/1966 | Hatch et al. | 18—26 X |

WILBUR L. McBAY, *Primary Examiner.*